United States Patent [19]

Spicer

[11] Patent Number: 5,260,078
[45] Date of Patent: Nov. 9, 1993

[54] EXPANDED WHEAT PRODUCT AND METHOD OF MANUFACTURE

[75] Inventor: Arnold Spicer, Palma/Mallorca, Spain

[73] Assignee: New Generation Foods, Inc., Oglesby, Ill.

[21] Appl. No.: 938,481

[22] Filed: Aug. 31, 1992

Related U.S. Application Data

[63] Continuation of Ser. No. 720,924, Jun. 25, 1991, abandoned.

[51] Int. Cl.$^5$ .............................. A21D 15/08
[52] U.S. Cl. ........................ 426/94; 426/99; 426/293; 426/302; 426/305; 426/450; 426/559; 426/625; 426/808
[58] Field of Search ............... 426/808, 804, 94, 293, 426/302, 305, 450, 559, 560, 625, 99

[56] References Cited

U.S. PATENT DOCUMENTS

| | | | |
|---|---|---|---|
| 4,259,359 | 3/1981 | Spicer | 426/625 |
| 4,438,146 | 3/1984 | Colby et al. | 426/625 |
| 4,497,840 | 2/1985 | Gould et al. | 426/560 |
| 4,517,204 | 5/1985 | Mottur et al. | 426/302 |
| 4,711,786 | 12/1987 | Schmidt | 426/19 |
| 4,777,045 | 10/1988 | Vanderveer et al. | 426/808 |
| 4,935,251 | 6/1990 | Verhoef et al. | 426/302 |
| 4,985,262 | 1/1991 | Camire et al. | 426/302 |

FOREIGN PATENT DOCUMENTS

| | | | |
|---|---|---|---|
| 0029967 | 3/1981 | Japan | 426/808 |
| 2126241 | 3/1984 | United Kingdom | 426/302 |

*Primary Examiner*—Helen F. Pratt
*Attorney, Agent, or Firm*—Fitch, Even, Tabin & Flannery

[57] ABSTRACT

An expanded food product is prepared by mixing wheat flour, water and a surfactant to make dough. The dough is extruded to make an expanded food product which is then dried and coated with a heated vegetable oil. The vegetable oil has a surfactant which is effective to break the surface tension of the retained moisture in the expanded food product and permits adherence of the oil. A dry seasoning having a particular particle size is then applied to the product.

11 Claims, No Drawings

EXPANDED WHEAT PRODUCT AND METHOD OF MANUFACTURE

This application is a continuation of application Ser. No. 720,924 filed Jun. 25, 1991 abandoned.

FIELD OF THE INVENTION

The present invention relates to an improved dietary product having a reduced level of fat and to a method for manufacture thereof, and, more particularly, the present invention relates to a cooked, edible product prepared from wheat which is in an expanded form and which, in a preferred embodiment, is in the form of a cylinder.

BACKGROUND OF THE INVENTION

There are, of course, many products available in the food industry which have an expanded structure and many processes have been devised to expand various food materials. U.S. Pat. No. 4,259,359 to Spicer describes a successful high-protein, whole wheat grain expanded food product. That product, however, contains a substantial level of fat. Current trends in snack food products and food products in general is to provide lower level of fat. The process described in the Spicer patent provides an expanded food product by grinding whole wheat having at least 11% protein to provide a ground whole wheat material which is formed into a dough. The dough has an edible acid present and may have a low level of fat present in the dough. The dough is worked while the dough is subjected to heating under high temperature, short time heating conditions. The heated dough is then extruded from a high pressure zone to a low pressure zone to effect expansion of the dough. The expanded dough is then dried to provide an expanded food product of desired structure.

The process of the Spicer patent also includes a method for coating the dried, expanded wheat product with a flavoring material. In the coating process, the dried, expanded wheat product is sprayed with a liquid vegetable oil at a level of 5% by weight of the product. Thereafter, a flavor carrying oil, which is a mixture of 50% high stability liquid vegetable oil and 50% hydrogenated coconut oil is heated and a flavoring material such as cheese powder is added to the heated oil. The cheese flavored-fat combination is then applied to the pre-coated expanded wheat product at a level of 15% to provide a flavored, expanded wheat product. The coating process described in the Spicer patent is not capable of producing a flavored, expanded wheat product having less than about 15% fat. At the lower levels of fat, the flavoring components do not properly adhere to the exterior surface of the expanded wheat product.

U.S. Pat. No. 4,438,146 to Colby, et al. also describes a method for producing a cooked, edible product prepared from wheat which is in an expanded form. The Colby, et al. patent is directed to a method for producing the expanded wheat product by extruding a wheat dough through a dye at a rate sufficient to generate heat and steam in the dough without any external heat source being provided to the dye. The heating is sufficient to cook the dough in the dye to condition the wheat and the dough is extruded into a lower pressure zone to flash steam and expand the dough.

In the method of the present invention for providing an expanded wheat product with lower fat level, either the method of the Spicer patent or the Colby, et al. patent can be used to provide an expanded wheat product which is subsequently dried. The present invention, however, provides dough compositions and coating compositions and a method for coating the expanded wheat product which can be utilized to provide an expanded wheat product with substantially lower levels of fat than have heretofore been possible.

Accordingly, it is a principal object of the present invention to provide an improved method for manufacture of an expanded food product from wheat which is tender and crisp and which has a low level of fat and acceptable flavor retention properties.

It is another object of the invention to provide a method for the preparation of a wheat product wherein dough primarily comprising ground wheat, moisture and a surfactant is mixed at ambient temperature and is extruded to provide an expanded wheat product which is dried and is a coated in a two-step coating process with a reduced level of fat and a desirable level of flavoring material. These and other objects of the invention will be more particularly described in the following detailed description.

SUMMARY OF THE INVENTION

The present invention is directed to a method for manufacture of an expanded food product. In the method, a dough is provided by mixing wheat flour with water having an effective amount of a surfactant dispersed therein. The dough is extruded under conditions suitable to provide an expanded food product. The expanded food product is then dried and coated in a two-step coating process. In the first step, a coating of heated vegetable oil is applied to the surface of the dried, expanded food product. The vegetable oil has an effective amount of a surfactant dispersed therein which is effective to break the surface tension of the retained moisture in the expanded food product and permit adherence of the oil. Thereafter, a dry seasoning having a particular particle size is applied to the oil coated, dried, expanded food product.

DETAILED DESCRIPTION OF THE INVENTION

The expanded wheat product of the invention comprises, on a dry basis, ground wheat at a level of from about 48% to about 85%, vegetable oil at a level of from about 5% to about 12%, surfactant at a level of from about 0.05% to about 0.75%, and seasoning at a level of from about 10% to about 15%. All percentages used herein are by weight unless otherwise specifically indicated. The product of the invention may further comprise a protein or dietary fiber enhancing material selected from the group consisting of oat bran, corn bran, corn meal, and triticale. The enhancing ingredients, when used, are present in the product at a level of from about 15% to about 25%. The grain ingredients are ground to a mesh size between 40 mesh and 60 mesh for inclusion into the dough. Finer grinds are preferred to avoid problems during extrusion and to promote digestion.

Since the wheat and the optional enhancing ingredients are naturally occurring, they vary somewhat in their analysis, depending in part on the season of the year, growing conditions, etc. However, typical analysis of the ingredients are as follows:

|  | Bran | Oat Bran | Corn Meal | Corn Triticale | Wheat |
|---|---|---|---|---|---|
| Protein | 18–20 | 4–6 | 7–9 | 14–18 | 10–16 |
| Fat | 9–10 | 3–5 | 9–11 | 1–2 | 1.8–2.2 |
| Moisture | 10 max | 11 max | 11 max | 13 max |  |
| Ash | 2.5–3.0 | .75–1.25 | .25–.4 | 1.5–2.5 |  |
| Carbohydrates | 58–62 | 5–7 | 78–82 | 68 |  |
| Dietary Fiber | 14–16 | 82–84 | .4 | 12–14 | 2.1–2.8 |
| Insoluble | 8–9 | 26=27 | — | 10.8–12.6 |  |
| Soluble | 6–6.8 | 56–57 | — | 1.2–1.4 |  |
| Calories/100 gm | 344 | 50 | 282 | 350 |  |

The ground wheat used in the product of the present invention is a ground product derived from whole wheat grain. In the manufacture of wheat flour, the aim is separation of the endosperm of the grain from the bran and germ, followed by pulverizing the endosperm to very small particles. The pulverized endosperm is the product generally regarded as flour.

The whole wheat must be ground to a predetermined particle size to provide a suitable substrate which is susceptible to expansion by the process of the invention. In this connection, the maximum particle size of the ground whole wheat must be less than the minimum dimension of the aperture in the die through which the dough is extruded to provided the expanded wheat product of the invention. Various shapes of apertures may be used, such as slots, circular or oblong holes, crescents, stars, etc. For most dies, the maximum particle size of the ground wheat material should be no greater than about 0.035 inch. This corresponds approximately to a requirement that all of the ground wheat material pass through a #20 mesh screen, United States standard sieve size. The openings in a #20 mesh screen are 0.0328 inches. It has been determined, however, that up to about 0.5 percent of the ground wheat particles can be greater than #20 mesh screen, but no particle can be greater than about 0.040 inch. The particle size distribution of the ground wheat material is not critical so long as the maximum particle size is not exceeded. The ground wheat preferably has a particle size of from about 20 mesh to about 60 mesh. The whole wheat is preferably ground in a pulverizing type grinder, such as a hammermill provided with a screening device so that the maximum particle size is controlled during the grind operation.

The ground wheat and any protein or fiber enhancing ground material, is moistened to prepare the dough. The moisture of the dough for extrusion is between about 14% and about 18%, including the moisture contained in the ground wheat and other enhancing ingredients. The surfactant is added to the dough after addition of the water and during mixing of the materials to provide the finished dough for extrusion. The surfactant is added at a level of from about 0.1% to about 0.75% based on the weight of the dough including the moisture.

The surfactant used in the product and method of the present invention is preferably lecithin or other suitable phospholipid or gum acacia. Lecithin is the preferred surfactant. Lecithin is any of several waxy hygroscopic phosphatides that are widely distributed in animals or plants. The phosphatides are choline esters of phosphatidic acids; which yield, upon complete hydrolysis, two fatty acid molecules and one molecule each of glycerol, phosphoric acid and choline.

After expansion upon extrusion from an extruder in accordance with the teachings of either U.S. Pat. No. 4,259,359 to Spicer and U.S. Pat. No. 4,438,146 to Colby, et al., the expanded product will have from about 9 to about 12% moisture and a density of from about 0.4 to about 0.7 grams/cc. The expanded product is in the form of a desired shape, such as a cylinder, hollow cylinder or chip. The expanded product is then dried to provide a product suitable for coating with a flavoring in accordance with the method of the invention to a moisture level of from about 2% to about 3%. Drying is preferably effected at a temperature of from about 110° F. to about 120° F.

The dried, expanded product is then coated with a vegetable oil to provide a surface adapted to receive a dry seasoning and to retain the dry seasoning in contact with the surface of the expanded product. In accordance with the present invention, it has been discovered that the addition of a surfactant in an amount sufficient to break the surface tension of the moisture retained in the product will provide a surface coating of oil at a reduced level which can still be used to retain the dry seasoning mix. The oil is preferably heated prior to application to the expanded food product to a temperature of from about 120° F. to about 140° F. The vegetable oil used as the coating material of the present invention may be any of the usual edible vegetable oils, such as corn oil, soybean oil, cottonseed oil, canola oil and palm oil.

The surfactant is preferably added to the oil at a level of from about 0.1% to about 0.75%, based on the weight of oil. The vegetable oil is applied to the expanded product at a level of from about 5% to about 12% of oil, based on the weight of the final food product. As previously indicated, this is substantially less oil than has heretofore been used in the manufacture of expanded products produced primarily from ground wheat. Such prior art products, such as produced in accordance with U.S. Pat. No. 4,259,359 to Spicer, have generally utilized a level of oil of about 16%. Also, in the method of the Spicer patent, the oil and seasoning materials are premixed prior to application to the expanded wheat product.

After the oil has been applied to the exterior surface of the expanded food product, the food product is coated with a dry, powdered seasoning having a particle size of not greater than about 40 mesh, American Standard sieve size. The dry seasoning mix preferably has a particle size of between about 40 mesh and about 60 mesh, corresponding to an absolute particle size of from about 0.05 inch to about 0.03 inch. The dry seasoning is applied at a level of from about 10% to about 15% based on the weight of the expanded, seasoned food product. The dry seasoning may be any of the popular types of seasoning, such as sour cream and onion, cheese, barbecue, chocolate and any other desired flavoring. While the powdered seasoning is characterized as being dry, there will usually be some residual moisture in the seasoning at a level of from about 1% to about 10% by weight.

The following examples further illustrate various features of the invention, but are intended in no way to limit the scope of the invention which is defined in the appended claims.

EXAMPLE 1

A base dough mix was prepared by mixing 80 pounds of ground wheat having a particle size of between about 60 mesh and 80 mesh, 20 pounds of corn bran and 14 pounds of water. After adding the water to the wheat and corn bran, lecithin was added to the mixture at a level of 0.1 pounds. The lecithin was added during mixing of the wheat, corn bran and water to form a dough. The dough mix was thoroughly mixed as disclosed in the method of U.S. Pat. No. 4,438,146 to Colby to provide uniform distribution of the ingredients throughout the dough and to provide an uncooked dough mix. The uncooked dough mix was subjected to a pressure of about 900 psi and to a temperature of about 180° F. while in an extruder to provide a cooked, expanded dough mix. The cooked dough mix exited from the extruder and expanded to four times the volume of the uncooked dough mix so as to provide the expanded, unseasoned product of the invention. The expanded dough mix had a moisture of about 10% and was dried at a temperature of 110° F. to a moisture of 2.5%.

Ten pounds of corn oil having 0.05 pounds of lecithin dispersed therein was then sprayed onto the dried, expanded wheat product. This provided a level of corn oil of 7.5% based on the weight of the final, seasoned wheat product.

Fifteen pounds of a dry cheese seasoning mix was then applied to the oil-treated expanded wheat product.

The cheese seasoning mix was applied by sprinkling the cheese seasoning mix onto the oil coated, expanded wheat product as the product was tumbled in a ribbon blender.

The resulting cheese flavored, expanded wheat product was crisp and the seasoning was retained on the surface of the expanded wheat product during packaging and shipping.

What is claimed is:

1. A method for manufacture of an expanded, seasoned, food product comprising
   (a) providing a dough by mixing ground wheat with water having a first surfactant selected from the group consisting of lecithin and gum acacia dispersed therein, said first surfactant being present at a level of from about 0.1% to about 0.75% based on the weight of said dough;
   (b) extruding said dough under conditions suitable to provide an expanded food product;
   (c) drying said expanded food product;
   (d) applying a coating consisting essentially of a vegetable oil and a second surfactant dispersed in said vegetable oil to said expanded food product, said oil being applied at a level of from about 5% to about 12% based on the weight of said expanded food product, said second surfactant being selected from the group consisting of lecithin and gum from about 0.1% to about 0.75% based on the weight of said oil present in said expanded food product; and
   (e) applying a dry seasoning having a particle size of from between about 40 mesh and about 60 mesh to said oil coated food product to provide an expanded, seasoned food product.

2. A method in accordance with claim 1 wherein said dough has from about 14% to about 16% of water.

3. A method in accordance with claim 1 wherein said extruded dough has a density of from about 0.4 to about 0.7 grams/cc and a moisture of from about 9% to about 12%.

4. A method in accordance with claim 1 wherein said extruded dough is dried to a moisture of from about 2% to about 3%.

5. A method in accordance with claim 1 wherein said oil is heated prior to applying said oil to said dried, expanded dough product.

6. A method in accordance with claim 5 wherein said oil is heated to a temperature of from about 120° F. to about 140° F.

7. A method in accordance with claim 1 wherein said dry seasoning mix has a particle size not greater than about 40 mesh.

8. A seasoned, expanded food product produced by extruding a dough through a die product comprising an expanded core structure comprising ground wheat, water and a first surfactant selected from the group consisting of lecithin and gum acacia dispersed in the water, said first surfactant being present at a level of from about 0.1% to about 0.75% and a coating consisting essentially of vegetable oil on the surface of said core structure, said vegetable oil having a second surfactant selected from the group consisting of lecithin and gum acacia dispersed therein at a level of from about 0.1% to about 0.75% and a dry seasoning adhering to said vegetable oil coating.

9. A food product in accordance with claim 8 wherein said core structure further comprises an enhancing material selected from the group consisting of oat bran, corn bran, corn meal and triticale.

10. A food product in accordance with claim 8 wherein water is present at a level of from about 2 to about 3% in said core structure, said vegetable oil is coated on the surface of said core structure at a level of from about 5% to about 12%, based on the weight of said food product and said dry seasoning is present at a level of from about 10% to about 15%, based on the weight of said food product.

11. A food product in accordance with claim 9 wherein said enhancing material is present at a level of from about of 15% to about 25%, based on the weight of said food product.

* * * * *